(12) United States Patent
Emmanuel

(10) Patent No.: US 10,469,123 B2
(45) Date of Patent: Nov. 5, 2019

(54) RADIO FREQUENCY FRONT END MODULE WITH HIGH BAND SELECTIVITY

(71) Applicant: NETGEAR, INC., San Jose, CA (US)

(72) Inventor: Joseph Amalan Arul Emmanuel, Cupertino, CA (US)

(73) Assignee: NETGEAR, INC., San Jose, CA (US)

( * ) Notice: Subject to any disclaimer, the term of this patent is extended or adjusted under 35 U.S.C. 154(b) by 0 days.

(21) Appl. No.: 15/797,442

(22) Filed: Oct. 30, 2017

(65) Prior Publication Data

US 2018/0062694 A1    Mar. 1, 2018

Related U.S. Application Data

(62) Division of application No. 14/289,562, filed on May 28, 2014, now Pat. No. 9,838,069.

(60) Provisional application No. 61/897,705, filed on Oct. 30, 2013.

(51) Int. Cl.
  *H04B 1/48*    (2006.01)

(52) U.S. Cl.
  CPC ......... *H04B 1/48* (2013.01); *H04B 2001/485* (2013.01)

(58) Field of Classification Search
  CPC ..... H04W 88/06; H04W 92/02; H04W 24/00; H04W 28/06; H04W 36/20; H04W 52/244; H04W 52/365; H04W 64/00; H04W 72/00; H04W 72/04; H04W 72/1215; H04W 74/00; H04W 88/02; H04W 88/10; H04B 1/52; H04B 1/006; H04B 1/0458; H04B 1/18; H04B 1/40; H04B 1/406; H04B 1/525; H04B 15/00; H04B 1/0053; H04B 1/0057; H04B 1/0064; H04B 1/0067; H04B 1/109; H04B 2215/068; H04B 7/0613; H04B 7/0837; H04B 7/10; H04B 7/2621
  See application file for complete search history.

(56) References Cited

U.S. PATENT DOCUMENTS

| 5,355,524 | A  | 10/1994 | Higgins |
| 5,903,820 | A  | 5/1999 | Hagstrom et al. |
| 6,483,398 | B2 | 11/2002 | Nagamori et al. |
| 6,771,475 | B2 | 8/2004 | Leete et al. |

(Continued)

FOREIGN PATENT DOCUMENTS

| CN | 1360760 A | 7/2002 |
| CN | 1647401 A | 7/2005 |

(Continued)

*Primary Examiner* — Golam Sorowar
(74) *Attorney, Agent, or Firm* — Perkins Coie LLP

(57) ABSTRACT

A radio frequency front end module is provided for a high power capability and a high signal band selectivity. The front end module includes an external filter and an integrated circuit coupled with the external filter via two external filter leads. The integrated circuit includes a transmit-receive switch, a power amplifier and a low noise amplifier. The transmit-receive switch alternates between coupling an antenna port to a transmit port and coupling the antenna port to a receive port. The power amplifier amplifies a modulated radio frequency signal. The low noise amplifier amplifies a received radio frequency signal when the antenna port is coupled to the receive port. The external filter can be replaced to adapt to various requirements of signal frequency bands, without the need of modifying the layout of the integrated circuit.

20 Claims, 7 Drawing Sheets

(56) References Cited

U.S. PATENT DOCUMENTS

| | | | |
|---|---|---|---|
| 2005/0032493 A1* | 2/2005 | Sugiyama | H04B 1/109 455/168.1 |
| 2006/0045202 A1 | 3/2006 | Rafi et al. | |
| 2006/0092079 A1 | 5/2006 | De Rochemont et al. | |
| 2006/0111060 A1 | 5/2006 | Kuriyama et al. | |
| 2006/0229030 A1* | 10/2006 | Simon | H04B 1/52 455/78 |
| 2007/0052581 A1 | 3/2007 | Shima et al. | |
| 2007/0184782 A1* | 8/2007 | Sahota | H04B 1/10 455/63.1 |
| 2008/0153497 A1* | 6/2008 | Kalhan | H04W 88/10 455/436 |
| 2008/0316948 A1 | 12/2008 | Knecht et al. | |
| 2009/0207764 A1 | 8/2009 | Fukamachi et al. | |
| 2010/0157858 A1 | 6/2010 | Lee et al. | |
| 2011/0165848 A1* | 7/2011 | Gorbachov | H04B 1/0064 455/78 |
| 2011/0221519 A1 | 9/2011 | Katoh et al. | |
| 2011/0299433 A1* | 12/2011 | Darabi | H04B 1/525 370/277 |
| 2012/0007692 A1 | 1/2012 | Song et al. | |
| 2013/0177116 A1 | 7/2013 | Wyville et al. | |
| 2013/0217343 A1 | 8/2013 | Tenbroek et al. | |
| 2014/0087671 A1* | 3/2014 | Mostov | H03F 1/0227 455/78 |
| 2014/0167878 A1* | 6/2014 | Lee | H03H 7/40 333/124 |

FOREIGN PATENT DOCUMENTS

| | | |
|---|---|---|
| CN | 101971512 A | 2/2011 |
| CN | 103236430 A | 8/2013 |
| TW | 200849844 A | 12/2008 |

* cited by examiner

RADIO FREQUENCY FRONT END MODULE WITH HIGH BAND SELECTIVITY

CROSS REFERENCE TO RELATED APPLICATIONS

This application is a divisional of U.S. patent application Ser. No. 14/289,562, filed May 28, 2014, which claims priority to provisional U.S. patent application Ser. No. 61/897,705, filed Oct. 30, 2013, which are incorporated herein in their entirety by this reference thereto.

BACKGROUND OF THE INVENTION

Field of the Invention

The invention relates to wireless networking technologies. More particularly, the invention concerns a radio frequency front end module with a high band selectivity and a high power capability.

Description of the Related Art

Radio communications are widely used in areas including sound signal transmission, video signal transmission, and data transmission. In various radio communication technology areas, radio receivers are used to receive radio waves intercepted by antennas and to convert the information carried by the radio waves into usable forms. Through a demodulation process, a radio receiver converts the information into sound signals, video signals, data, or other useful signals. Devices that contain radio receivers include, e.g., cell phones, wireless network devices, Bluetooth devices, etc.

For industrial, scientific, medical and other purposes, various radio frequency devices transmit and receive radio frequency signals at radio bands, which are collectively labeled the industrial, scientific and medical (ISM) radio bands. Generally, the ISM radio bands are internationally reserved for civil usages. In recent years, these ISM bands have become particularly popular among short-range, low power communications systems. For example, the 2.4 GHz band is used by communications of cordless phones, Bluetooth devices, near field communication (NFC) devices, ZigBee devices, radio control toys, and wireless network devices. Because there are many different usages of the ISM bands, the emissions of the devices operating at the ISM bands can create electromagnetic interferences and disrupt the radio communications of other devices at the same or nearby frequency. Thus, the communication devices operating at the ISM bands need to tolerate the interferences generated by other devices operating at the same or nearby bands.

SUMMARY OF THE INVENTION

According to at least one embodiment, disclosed herein is a wireless access point device that enables other wireless devices to connect to a wired network. The wireless access point device provides a high band selectivity to be easily optimized for various radio frequency bands. The wireless access point device also has a high energy capability to handle radio frequency power of, e.g., up to 1000 milliwatts (mW). The wireless access point device can communicate with the wireless devices using, e.g., WiFi standard to exchange data using radio waves at 2.4 GHz and 5 GHz frequencies.

The device can include a radio frequency front end module (FEM) having components printed on an integrated circuit. An external filter, such as a band pass filter, can be connected to the integrated circuit to provide a high selectivity in terms of signal band width. The front end module has amplifiers, filters and switches that can handle radio frequency signals with a power of hundreds of mW.

By switching the external filter, the front end module can adapt to various applications that have different requirements for signal frequency bands. Thus, the front end module can be flexibly utilized in different situations. Such an FEM can be used in both base stations (e.g., access point devices) and mobile stations (e.g., mobile phones). For example, the FEM can be used in Wireless access point devices, LTE devices, GSM devices, 3G devices, Z-Wave devices, ZigBee devices, DECT devices, cordless phones, wireless power meters, etc.

The integrated circuit of the FEM has a very small footprint, because the size of the integrated circuit is much smaller than a discrete circuit made from discrete components. A device using the FEM can even accommodate multiple integrated circuits to handle signals at different frequency bands, in order to achieve a multiple-input and multiple-output (MIMO) functionality. The cost of the integrated circuit is also lower than the cost of the discrete circuit. Furthermore, the FEM is flexible to power supply voltage, and is able to operate under, e.g., both 3.3 volts and 5 volts.

The FEM can be used in different models of devices without the need for modifying the layout of the integrated circuit. The FEM can adapt to various signal band requirements by simply changing the external filter. Such a design also significantly reduces the time to modify (TTM), because a design engineer can work with the same type of manufactured integrated circuit and does not need to tweak the components within the integrated circuit. Such a design also easily passes regulatory requirements because the tests will use FEMs having the same integrated circuit.

By using external filters that have high Q-factors, a device using the FEM can coexist (e.g., operate without significant interference) with other devices, such as WiFi devices, for dual band concurrent operation, LTE devices, GSM devices, 3G devices, Z-Wave devices, ZigBee devices, DECT devices, etc.

DETAILED DESCRIPTION

The nature, objectives, and advantages of the invention will become more apparent to those skilled in the art after considering the following detailed description in connection with the accompanying drawings.

Figure 1:
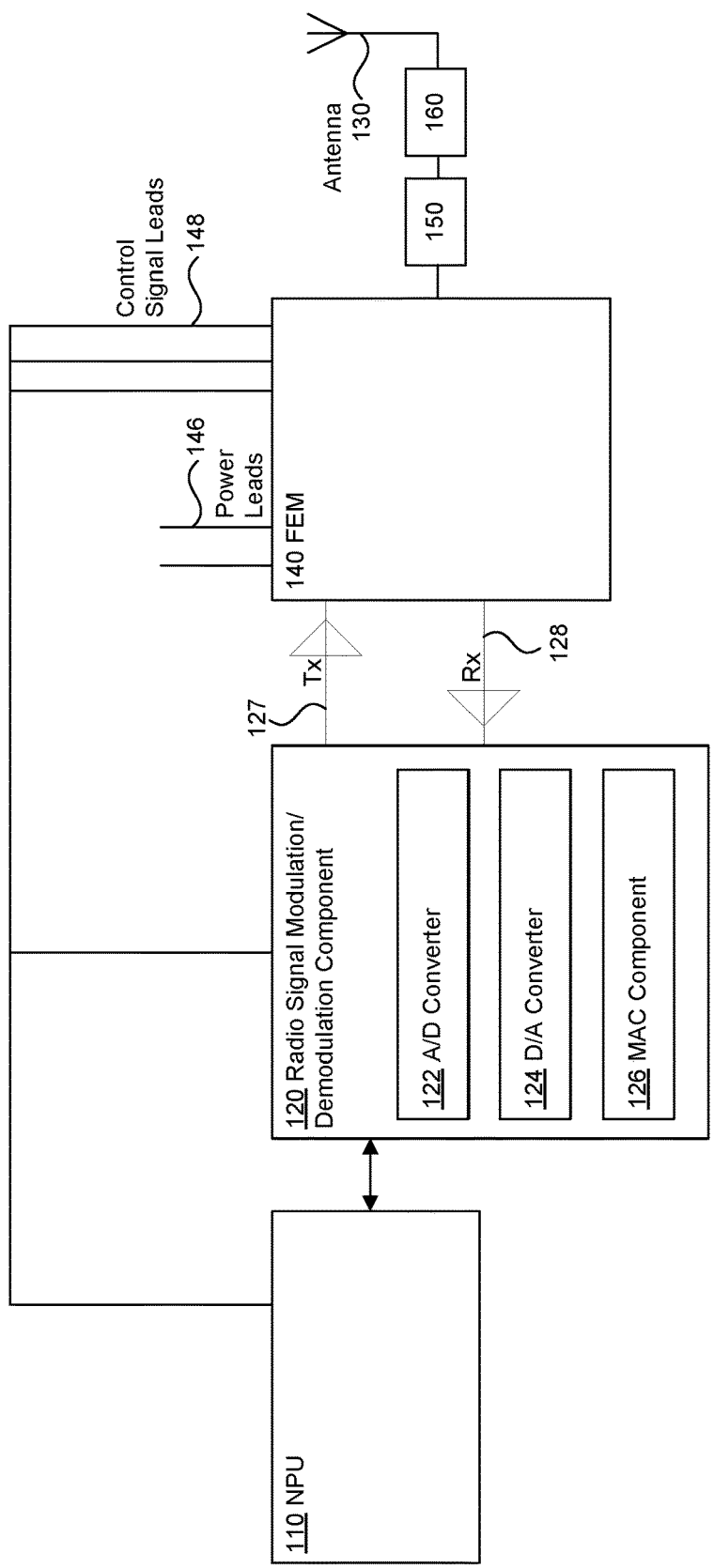
FIG. 1 is a block diagram of showing a wireless access point device.

FIG. 1 is a block diagram showing a wireless access point device, according to an embodiment. The wireless access point device 100 includes a network processing unit (NPU) 110, a radio signal modulation/demodulation component 120, a front end module (FEM) 140 and an antenna 130. The NPU 110 can be an integrated circuit that can perform various tasks targeted at the networking applications. The tasks of the NPU 110 can include, e.g., pattern matching, routing information lookup, computation, data field manipulation, packet queue management, packet buffer allocation, etc.

The radio signal modulation/demodulation component 120 is responsible for extracting an information-bearing signal from a modulated carrier wave (i.e., demodulation), and conveying an information-bearing signal (baseband message signal) onto a carrier wave (passband signal) (i.e., modulation). In other words, the radio signal modulation/demodulation component 120 receives the analog carrier wave from the FEM 140, and extracts the data signal from the analog carrier wave. The radio signal modulation/demodulation component 120 also applies data signal to the analog carrier wave, and sends the modulated wave to the FEM and antenna for transmitting. The radio signal modulation/demodulation component 120 can be designed to handle modulated carrier wave of different frequencies. For example, the radio signal modulation/demodulation component 120 may generate a modulated radio frequency signal having a frequency of 2.4 GHz or 5 GHz that conveys a message signal under an IEEE 802.11 specification. The radio signal modulation/demodulation component 120 may further demodulate a received radio frequency signal having a frequency of 2.4 GHz or 5 GHz, to extract a message signal under an IEEE 802.11 specification. The radio signal modulation/demodulation component 120 can supply the extracted data signal to the NPU 110 for further processing.

The radio signal modulation/demodulation component 120 can include an analog-to-digital (A/D) converter 122. The A/D converter 122 converts the extracted data signal from an analog form to a digital form. The radio signal modulation/demodulation component 120 can also include a digital-to-analog (D/A) converter 124. The D/A converter 124 converts the data signal from a digital form to an analog form. The radio signal modulation/demodulation component 120 can further include a media access control (MAC) component 126 that provides an addressing and channel access control mechanism for multiple wireless terminals to communicate within a wireless network.

The radio signal modulation/demodulation component 120 connects to the FEM 140 through a transmitting (Tx) signal path 127 and a receiving (Rx) signal path 128. The radio signal modulation/demodulation component 120 sends the modulated carrier wave signal to the FEM 140 through the Tx signal path 127. The radio signal modulation/demodulation component 120 receives incoming wave signal from the FEM 140 through Rx signal path 128.

Although FIG. 1 illustrates the radio signal modulation/demodulation component 120 as a single component, in some embodiments, the functionalities of the radio signal modulation/demodulation component 120 can be realized by separate components. For example, a wireless access point device 100 can include a modulation component and a demodulation component for the tasks of modulation and demodulation, respectively. Alternatively, the A/D converter 122, the D/A converter 123 and the MAC component 126 can be components that are separate from the radio signal modulation/demodulation component 120.

The FEM 140 includes circuitry for processing the wave signal at the original incoming radio frequency as received by the antenna 130. The FEM 140 can amplify the modulated signal received from the radio signal modulation/demodulation component 120, apply a filter to attenuate the amplified signal at frequencies higher than a cutoff frequency, and send the signal to the antenna 130 for radio signal broadcasting. The FEM 140 can also receive a radio signal captured by the antenna 130, filter the received radio signal to attenuate frequencies outside of a specific frequency range, and apply the signal to be sent to the radio signal modulation/demodulation component 120.

The FEM 140 also includes one or more power leads 146 for supplying electrical power for operating the FEM 140. The FEM 140 can further include one or more control signal leads 148 for controlling various components of the FEM 140. Via the control signal leads 148, the FEM 140 can be connected with the NPU 110, the radio signal modulation/demodulation component 120, or both. Thus, either the NPU 110, or the radio signal modulation/demodulation component 120, can control the operation of the FEM 140.

The wireless access point device 100 can further include an impedance matching circuit 150 placed between the FEM 140 and the antenna 130. The impedance matching circuit 150 matches the input impedance of the FEM 140 with the impedance of the antenna 130, so that signals with maximum power can be transferred from and to the antenna. The impedance circuit 150 can be, e.g., a pi-match circuit.

The impedance matching circuit 150 is connected to the antenna 130 via a radio frequency connector 160. The radio frequency connector can be, e.g., a U-FL connector or an I-PEX connector for transferring high-frequency signals.

In some alternative embodiments, a device can include an integrated circuit or chip that can achieve the functionalities of both the NPU 110 and the radio signal modulation/demodulation component 120. The technologies disclosed herein can also be applied to such a device.

Although FIG. 1 illustrates a wireless access point device 100, the technologies disclosed herein can be applied to other devices as well, such as base stations, mobile devices, wireless networking devices, or other electronic devices that are capable of receiving and/or transmitting radio frequency signals.

Figure 2:
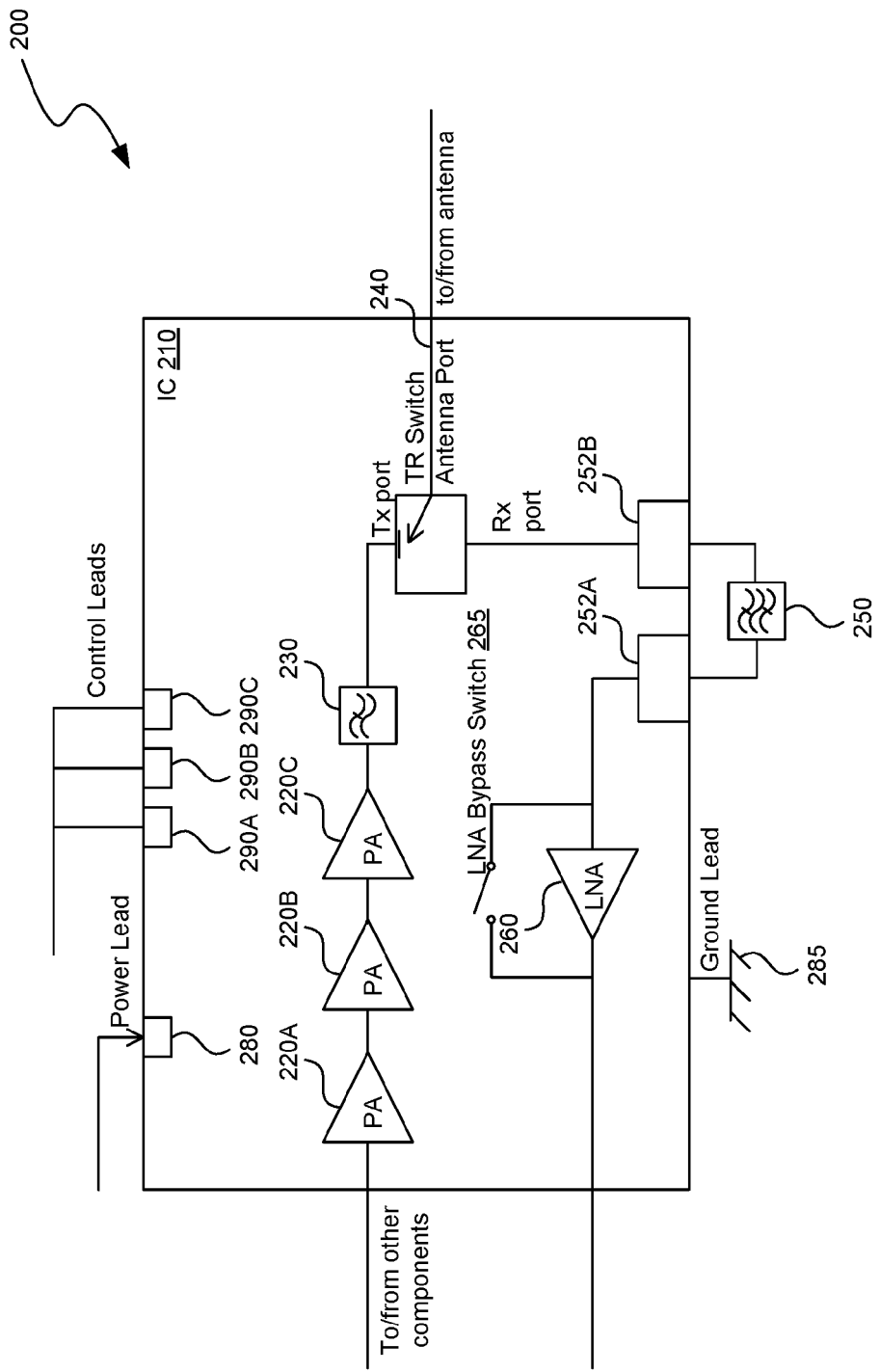
FIG. 2 is a block diagram of showing a radio frequency front end module.

The FEM 140 can include various components for purposes such as signal amplification, frequency filtering, or transmit-receive duty cycle circulation. FIG. 2 is a block diagram of showing a radio frequency front end module, according to an embodiment. The front end module (FEM) 200 can be connected to an antenna to sending and receiving electromagnetic wave signals. The FEM 200 can also be connected to a radio signal modulation/demodulation component, as illustrated in FIG. 1.

The FEM 200 includes an integrated circuit (IC) 210 and at least one external filter 250. The IC 210 is a small chip of semiconductor material (e.g., silicon, indium phosphide, silicon germanium, gallium nitride) including a set of electronic circuits. In some embodiments, the IC 210 is a monolithic microwave integrated circuit (MMIC) that operates at microwave frequencies (e.g., from 300 MHz to 300 GHz). The IC 210 can use Metal-Semiconductor Field-Effect Transistors (MESFETs), High Electron Mobility Transistors (HEMTs), Pseudomorphic HEMTs, or Heterojunction Bipolar Transistors as the active devices in the IC. The dimensions of the IC 210 can be, e.g., 1 mm$^2$ to 10 mm$^2$. The packaging of the IC 210 can be, e.g., quad-flat no-leads (QFN) packaging, or plated-through holes (PTH) packaging. The chip of the IC210 can be a surface-mount device (SMD).

The IC 210 includes one or more RF power amplifiers (PAs) 220A-220C, a low pass filter (LPF) 230, a transmit-receive switch (TR switch) 240, a low noise amplifier (LNA) 260, and an LNA bypass switch 265. Instead of having discrete analog components to achieve separate functionalities, the IC 210 is made from a single chip. Such a chip can be much smaller than a discrete circuit made from separate components. In one embodiment, an area of the chip is around 5×4 mm². In another embodiment, an area of the chip is around 7×5 mm². In addition, the cost of manufacturing the IC 210 is lower comparing to a discrete circuit, since the components of the IC 210 are printed by photolithography rather than being constructed with discrete transistors.

The PAs 220A-220C are used to convert a radio frequency signal of a lower power into a signal of larger power. The PAs 220A-220C, connected in cascade, form a multistage amplifier. In other words, the output of the PA 220A is connected to the input of the PA 220B; and in turn, the output of the PA 220B is connected to the input of the PA 220C. The overall gain of the PAs 220A-220C, expressed in decibels (dB), is the sum of the gains of the individual PAs. The PAs 220A-220C are amplifiers that have high output powers. The output current of the PAs 220A-200C can be, e.g., 500 milliamp (mA) to 700 mA. In one embodiment, the PAs 220A-220C can have a total output RF power of more than 100 mW, up to around 1000 mW. In another embodiment, the PAs 220A-220C can achieve an output RF power of more than 1000 mW.

FEM 200 receives a modulated signal from an antenna and amplifies the modulated signal using the PAs 220A-220C, then sends the amplified signal to the low pass filter (LPF) 230. The LPF is a filter that passes low-frequency signals and attenuates (i.e., reduces amplitude) signals with frequencies higher than a particular cutoff frequency. Therefore, the LPF 230 (basically a harmonic filter) blocks harmonic emissions that might interfere with other communications. The harmonic filter can be, e.g., an integrated passive device (IPD).

Although the LPF 230 is illustrated as a component included in the IC 210, alternatively, the LPF 230 can also be a discrete component outside of the IC. For example, similar to the BPF 250, the LPF 230 can be connected to the IC via filter leads.

The signal that passes though the LPF 230 is sent to the antenna via a transmit-receive (TR) switch 240 for radio wave transmitting. The TR switch 240 has an antenna port, a transmit (Tx) port and a receive (Rx) port. The TR switch 240 alternates between a status of connecting the antenna port to the Tx port and another status of connecting the antenna port to the Rx port, under a time-division multiplexing (TDM) framework. In other words, the TR switch routes radio frequency signals from the Tx port (i.e., from the LPF 230) to the antenna port, and from the antenna port to the Rx port (i.e., to the external filter 250), without allowing the signals to pass directly from Tx port to Rx port. FIG. 2 illustrates a status when the TR switch 240 connects the antenna port to the Tx port. In other words, the TR switch can control the percentage of time (i.e. duty cycle) when the antenna port is connected to the Tx port or the Rx port. For access point or base station, the duty cycle of the TR switch can be up to 100%, i.e., 100% of the total period of operation time of the TR switch is effectively used to transmit or receive signals.

The TR switch 240 can have a low power loss; the insertion loss of the TR switch 240 can be 0.5 dB. The TR switch 240 can also handle high power RF signal; the one-decibel compression point (P1dB) can be 35 decibel-milliwatt (dBm). In some alternative embodiments, the TR switch 240 can be replaced by, e.g., a radio frequency signal circulator or a duplexer.

The IC 210 has one or more filter leads 252A-252B to be connected to the external filter 250. Through the filter leads 252A-252B, the external filter 250 is electrically coupled between the Rx port of the TR switch and the LNA 260. The external filter 250 can be, e.g., a band pass filter (BPF). The band pass filter passes signals at frequencies within a specific range (i.e., pass band) and attenuates (i.e., reduces amplitude) signals at other frequencies outside that pass band. The pass band is defined by upper and lower cutoff frequencies. The bandwidth of the band pass filter is the difference between the upper and lower cutoff frequencies. The band pass filter can be characterized by a Q-factor. A band pass filter with a high Q-factor will have a narrow pass band; a band pass filter with a low Q-factor will have a wide pass band.

The band pass filter 250 can be a LC circuit filter, a low temperature co-fired ceramic (LTCC) filter, surface acoustic wave (SAW) filter, a bulk acoustic wave (BAW) filter, a thin-film bulk acoustic resonator (TFBAR) filter, etc. The band pass filter 250 can be a filter component having a physical structure that cannot be realized by a photolithography technology.

When the TR switch connects the antenna port to the Rx port, the signal received from the antenna is sent to the band pass filter 250. The band pass filter 250 allows signals within a selected range of frequencies (pass band) to pass through, and prevents interfering signals at unwanted frequencies from passing through. Thus, the band pass filter 250 optimizes the signal-to-noise ratio of the received signal, by eliminating the noises from unwanted frequencies.

The band pass filter 250 can be chosen to have a pass band that is consistent with the target signal frequency of the FEM 200. For example, if the FEM 200 is used to process RF signals at 2.4 GHz, the band pass filter 250 can be chosen to have a pass band centered at around 2.4 GHz. If the FEM 200 is used to process RF signals at 5 GHz, the band pass filter 250 can be chosen to have a pass band centered at around 5 GHz. Because the band pass filter 250 is electrically coupled to the IC 210 through the filter leads 252A-252B, the FEM 200 has the flexibility to change the band pass filter 250 depending on the target RF signal frequency, without mortifying any configuration of the IC 210. By choosing an appropriate BPF to filter out unwanted frequencies, the FEM 200 can work at any microwave band, such as one of the ISM bands.

The same IC 210 can be used for different purposes, by supplying different external filters. For example, a wireless access point device handling both 2.4 GHz and 5 GHz WiFi signals can include two FEMs for handling 2.4 GHz and 5 GHz frequencies separately. The first FEM contains the IC 210 and a BFP for 2.4 GHz pass band. The second FEM contains the same IC 210 and a BFP for 5 GHz pass band. The Q-factors of these BFPs can be relatively low, due to the large band difference between 2.4 GHz and 5 GHz.

Alternatively, a wireless access point device handling both WiFi 2.4 GHz signal and cellular 4G signal can include two FEMs for handling the 2.4 GHz WiFi signal and cellular 4G signal separately. The WiFi signals are at 2.412-2.472 GHz; while the cellular 4G signals can be, e.g., at 2.496-2.690 GHz. The BFPs for these two FEMs need to have high Q-factors, due to the small band difference between the WiFi signal and the cellular 4G signal.

In some other embodiments, the band pass filter 250 can be a tunable band pass filter. The pass band of the band pass filter can be adjusted dynamically during the operation of the FEM 200. Therefore, the FEM 200 can dynamically adjust its target operating signal frequency during operation.

In some situations, the external filter 250 can be a diplexer, instead of a BPF. For example, if the antenna is a dual band antenna that is capable of receiving both 2.4 GHz and 5 GHz signals, the diplexer can be used to separate the 2.4 GHz and 5 GHz signal. The diplexer can feed the 5 GHz signal to the LNA 260, and effectively filter out the 2.4 GHz. Since there is a large band gap between the 2.4 GHz and 5 GHz signals, the insertion loss can be less than 0.5 dB.

The receiving RF signals that pass through the BPF 250 reach the low noise amplifier (LNA) 260. The low noise amplifier is used to amplify the signals received from the antenna, which are usually weak. The LNA 260 boosts the desired signal power while adding as little distortion or noise as possible. The output current of the LNA 260 can be, e.g., up to 20 mA. The nose figure (NF) of the LNA 260 can be, e.g., 1 dB. The effect of noise from subsequent signal processing stages is reduced by the gain of the LNA 260. The signals amplified by the LNA 260 are sent to other components for further processing (e.g., by the radio signal modulation/demodulation component 120). The IC 210 can further include an LNA bypass switch 265 to bypass the LNA if the components at the later processing stages will amplify the signal, or if the signals received at the antenna are strong enough for further processing.

The LNA 260 can have a low noise figure and can handle high power signals. For example, for 2.4 GHz signals, the LNA 260 can have a noise figure of 1.2 dB, a gain of 17 dB, and a one-decibel compression point (P1dB) of +10 dBm. For 5 GHz signals, the LNA 260 can have a noise figure of 1.5 dB, a gain of 15 dB, and a one-decibel compression point (P1dB) of +10 dBm.

The IC 210 can include one or more control signal leads 290A-290C for controlling various components of the FEM 140. Via the control signal leads 290A-290C, other components of the device, such as a NPU or a radio signal modulation/demodulation component, can control the operations of the components in the IC 210. For example, the control leads 290A-290C can supply control signals to control the operation of (e.g., turn on or off) the PAs 220A-220C, to control the duty cycle of the TR switch 240, or to turn on or off the LNA bypass switch 265.

The IC 210 can also include one or more power leads 280 for supplying electrical power for operating the IC 210. The IC 210 can supply power to components, such as PAs 220A-220C, LFP 230, TR switch 240, LNA 260, and/or LNA bypass switch 265 for operation. The power lead 280 can connect to different power sources. The components of the IC 210 can operate at different voltages, such as 3.3 volts and 5 volts.

For example, the power lead 280 can connect to a 3.3 volts power source and a 5 volts power source. The 3.3 volts power source can be, e.g., a battery. The 5 volts power source can be, e.g., a direct current (DC) power supply. The IC 210 can operate on both 3.3 volts and 5 volts. When the 5 volts DC power supply is not available, the IC 210 works at 3.3 volts and is powered by the battery. When the 5 volts DC power supply is available, the IC 210 switches to work at 5 volts and is powered by the DC power supply.

The RF signal power output of the IC 210 can be different depending on the voltage of the power supply. For example, in some embodiments, when the IC 210 operates at 5 Volts, the output power level of the IC 210 is 26 dBm. When the IC 210 operates at 3.3 Volts, the output power level of the IC 210 is 23 dBm.

The IC 210 can further include one or more ground lead 285. For example, the IC 210 can connect the ground lead 285 to a ground plate as the electrical ground. The ground lead 285 can also serve as a channel for transmitting the heat generated by the IC 210 so that the heat can be dissipated at the ground plate. In some embodiments, the power efficiency of a FEM can be 10% or lower. If the FEM's RF power is around 1000 mW, the total power consumption is about 10000 mW. Almost 9000 mW needs to be dissipated through the ground lead 285 to the ground plate.

Figure 3:
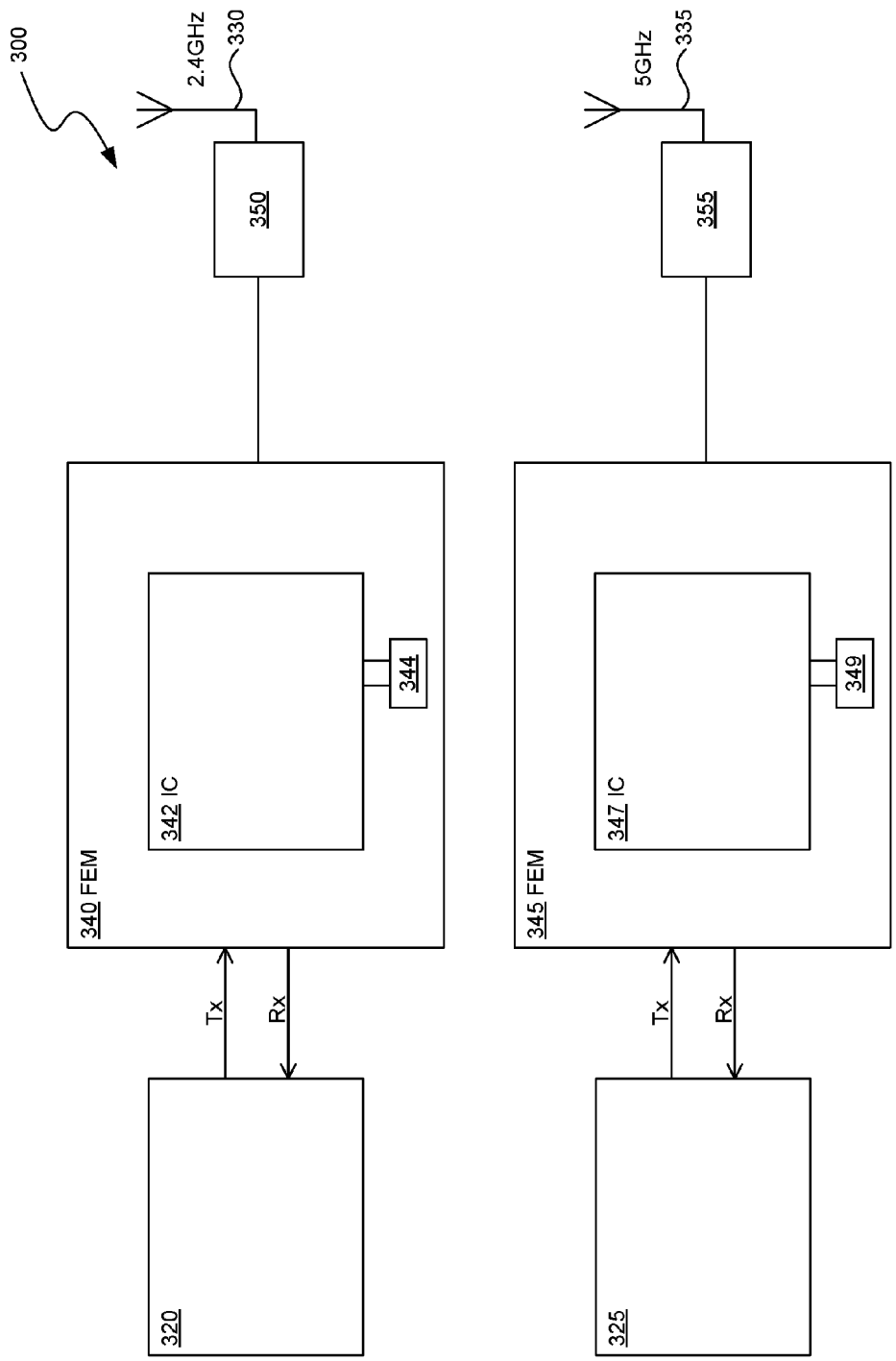
FIG. 3 is a block diagram of showing a wireless access point device including multiple front end modules and multiple antennas.

An access point device (or other types of wireless networking devices) can include multiple FEMs to handle signals from different frequencies. FIG. 3 is a block diagram showing another wireless access point device, according to an embodiment. The wireless access point device 300 can handle two different types of signals. The wireless access point device 300 includes two antennas. For example, the first antenna 330 is responsible for transmitting and receiving 2.4 GHz WiFi signal; while the second antenna 335 is responsible for transmitting and receiving 5 GHz WiFi signal.

Through an impedance matching circuit 350, the FEM 340 transmits 2.4 GHz signals to and receives 2.4 GHz signals from the antenna 330. The FEM 340 includes an IC 342 and an external filter 344. The IC 342 can be, e.g., the IC 210 illustrated in FIG. 2. The external filter 344 can be a band pass filter or a diplexer that rejects signals outside the frequency range of the WiFi 2.4 GHz signals. The radio signal modulation/demodulation component 320 modulates the output 2.4 GHz RF signals, and demodulates the input 2.4 GHz RF signals.

Similarly, the wireless access point device 300 has another set of components for processing 5 GHz WiFi signals. Through an impedance matching circuit 355, the FEM 345 transmits 5 GHz signals to and receives 5 GHz signals from the antenna 335. The IC 347 can be the same type of IC of the IC 342. The difference between the FEM 340 and the FEM 345 is the choice of external filters 344 and 349. The external filter 349 can be a band pass filter or a diplexer that rejects signals outside the frequency range of the WiFi 5 GHz signals. The radio signal modulation/demodulation component 325 modulates the output 5 GHz RF signals, and demodulates the input 5 GHz RF signals.

Although FIG. 3 illustrates an access point device that handles the WiFi signals of two frequency bands, the technology disclosed herein can be applied to other devices that handle different types of signals. Furthermore, such a device can handle signals from more than two frequency bands. For example, a wireless networking devices can include three FEMs for processing signals of the 2.4 GHz WiFi band, the 5 GHz WiFi band, and 2.4 GHz cellular 4G band, respectively. The FEMs can use different external filters to ensure the signal qualities. For example, the two FEMs for the 2.4 GHz WiFi band and 2.4 GHz cellular 4G band can use band pass filters with high Q-factors to separate the signals, because these two bands are close in the frequency spectrum. In contrast, the FEM for the 5 GHz WiFi band can use a band pass filter with a low Q-factor or just a diplexer to pass through the 5 GHz signals.

Figure 4:
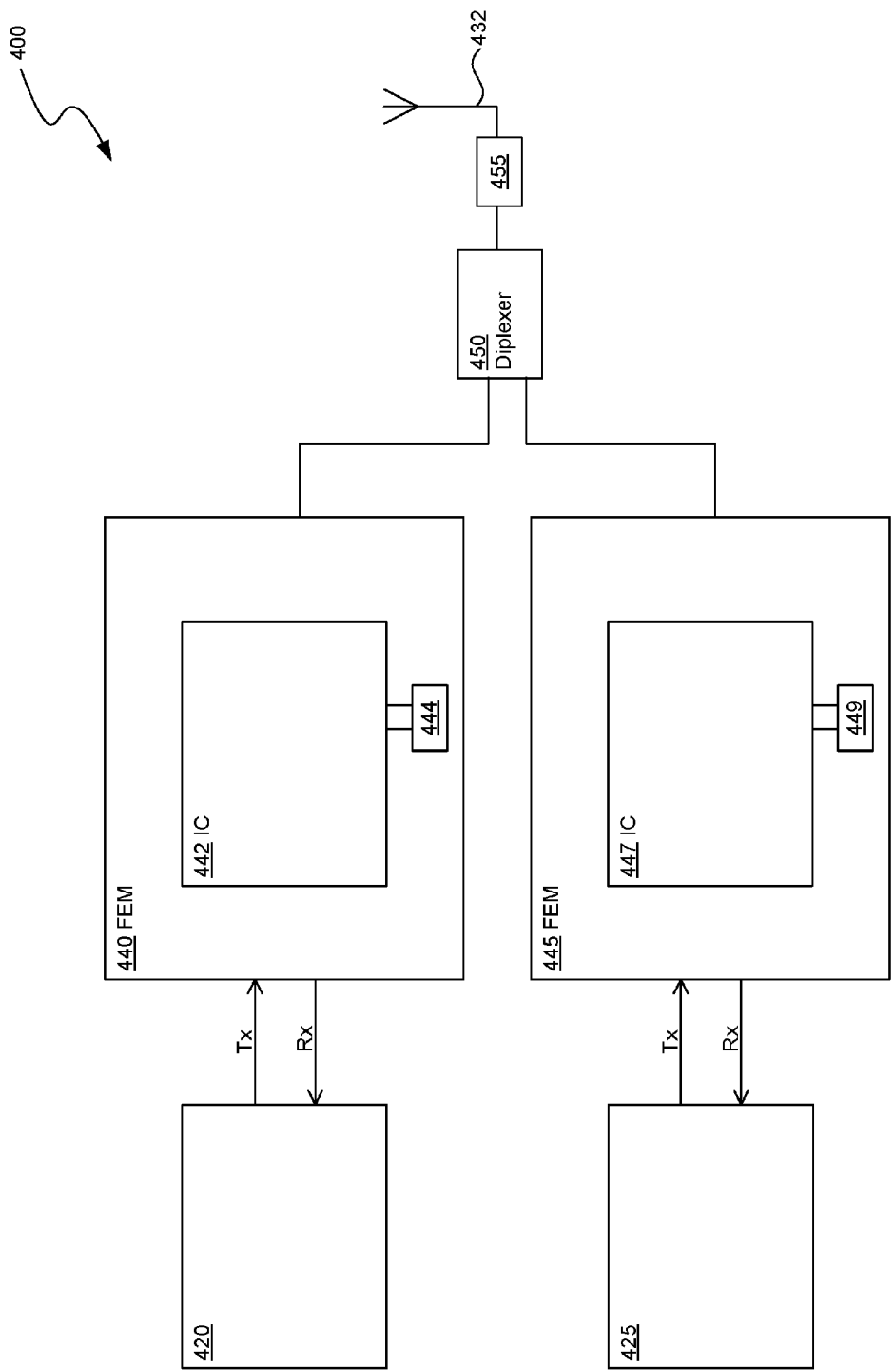
FIG. 4 is a block diagram of showing a wireless access point device including multiple front end modules and one antenna.

A wireless networking device can also include a single antenna to handle signals of different frequency bands. FIG. 4 is a block diagram of showing yet another wireless access point device, according to an embodiment. Similar to the device illustrated in FIG. 3, the wireless access point device 400 includes separate FEMs 440, 445 and radio signal modulation/demodulation components 420, 425 for processing the 2.4 GHz and 5 GHz signals separately. The antenna 430 (e.g., a dual band antenna) transmits and receives signals in both the 2.4 GHz and 5 GHz bands. The impedance matching circuit 455 matches the input impedance of the FEMs 440 and 445 with the impedance of the antenna 430. The diplexer 450 separates the 2.4 GHz and 5 GHz signal. The diplexer 450 feeds the received 2.4 GHz signals to the REM 440 and relays output 2.4 GHz signals from the REM 440 to the antenna 430. The diplexer 450 also feeds received 5 GHz signals to the REM 445 and relays output 5 GHz signals from the REM 445 to the antenna 430.

Although FIGS. 3 and 4 illustrate devices having multiple ICs for processing signals from different frequency bands separately, the technology disclosed herein can also be applied to a single IC for processing signals from different frequency bands. For example, a single IC can include multiple FEM sections. Each FEM section includes a set of components inside the IC 210 as illustrated in FIG. 2. The single IC can also include a diplexer or multiplexer that separates the signals from different frequency bands and feeds the signals to different FEM sections. In other words, such a single IC has equivalents of the IC 442, IC 447 and the diplexer 450 printed on a single chip using a photolithography technology.

In some embodiments, during operation, a front end module (FEM) can dynamically adjust the characteristics of the external filter to adapt the FEM itself for processing signals from different frequency bands. For example, if the external filter is a tunable band pass filter, the device can send a control signal to the tunable band pass filter to dynamically adjust the pass band of the filter. Alternatively, the FEM can include multiple band pass filters and can dynamically choose to connect to one of the available band pass filters.

Figure 5:
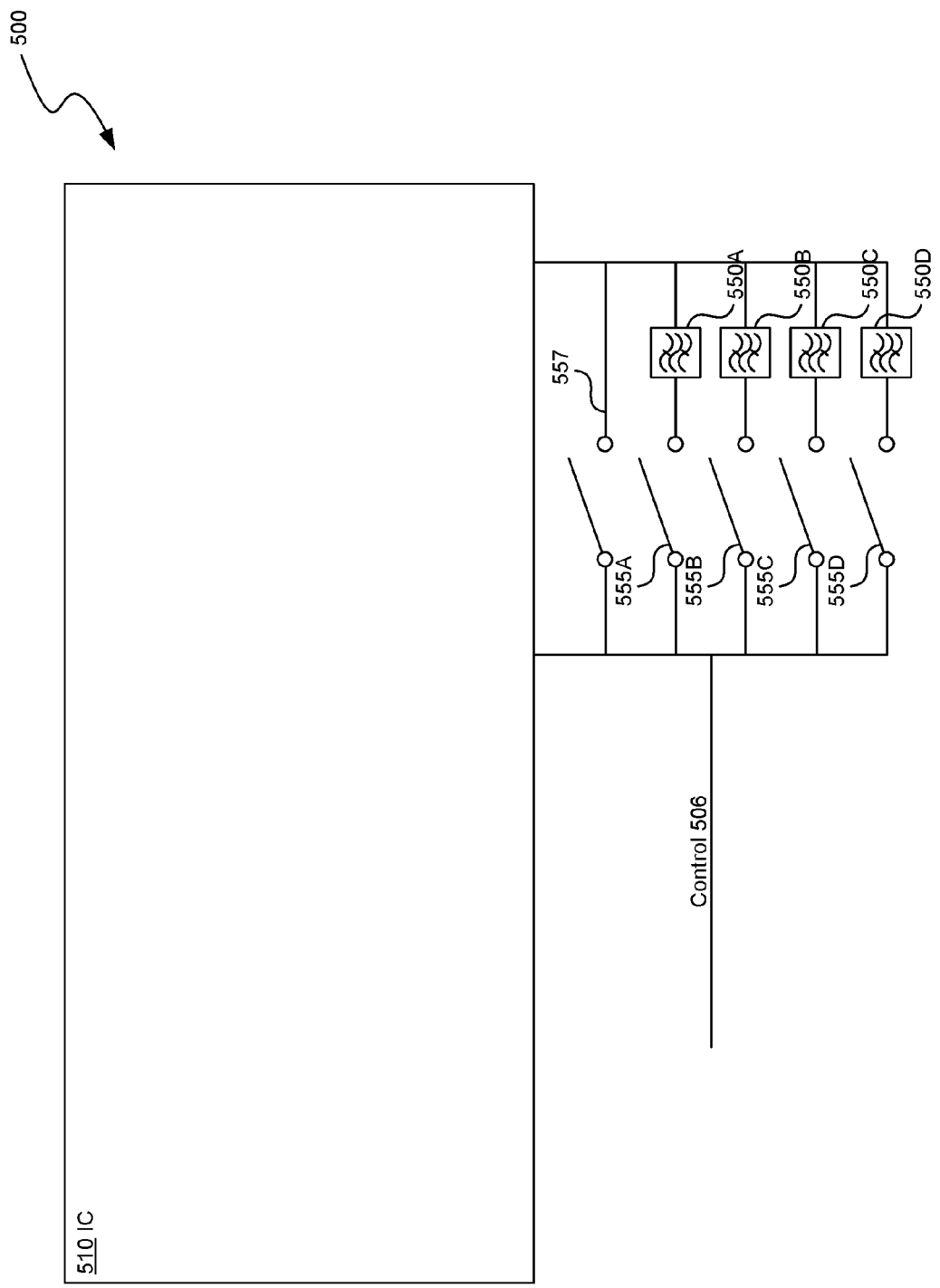
FIG. 5 is a block diagram of showing a front end module containing multiple band pass filters.

FIG. 5 is a block diagram of showing a front end module containing multiple band pass filters, according to an embodiment. The IC 510 of the FEM 500 can be the same IC as illustrated in FIG. 2. The band pass filters 550A-550D are different filters with different pass bands. The switches 555A-555D control which filter of the filters 550A-550D connects with the IC 510. A control lead 556 transmits the control signal for closing one of the switches 555A-555D and for opening the rest of the switches 555A-555D. Therefore, at one time, only one switch is connected to the IC 510. The control signal can also open all of the switches 555A-555D and close a bypass switch 557, in case there is a need to bypass all the band pass filters. Various components of the device, such as an NPU, a radio signal modulation/demodulation component, or the FEM 500 itself, can generate the control signal.

Figure 6:
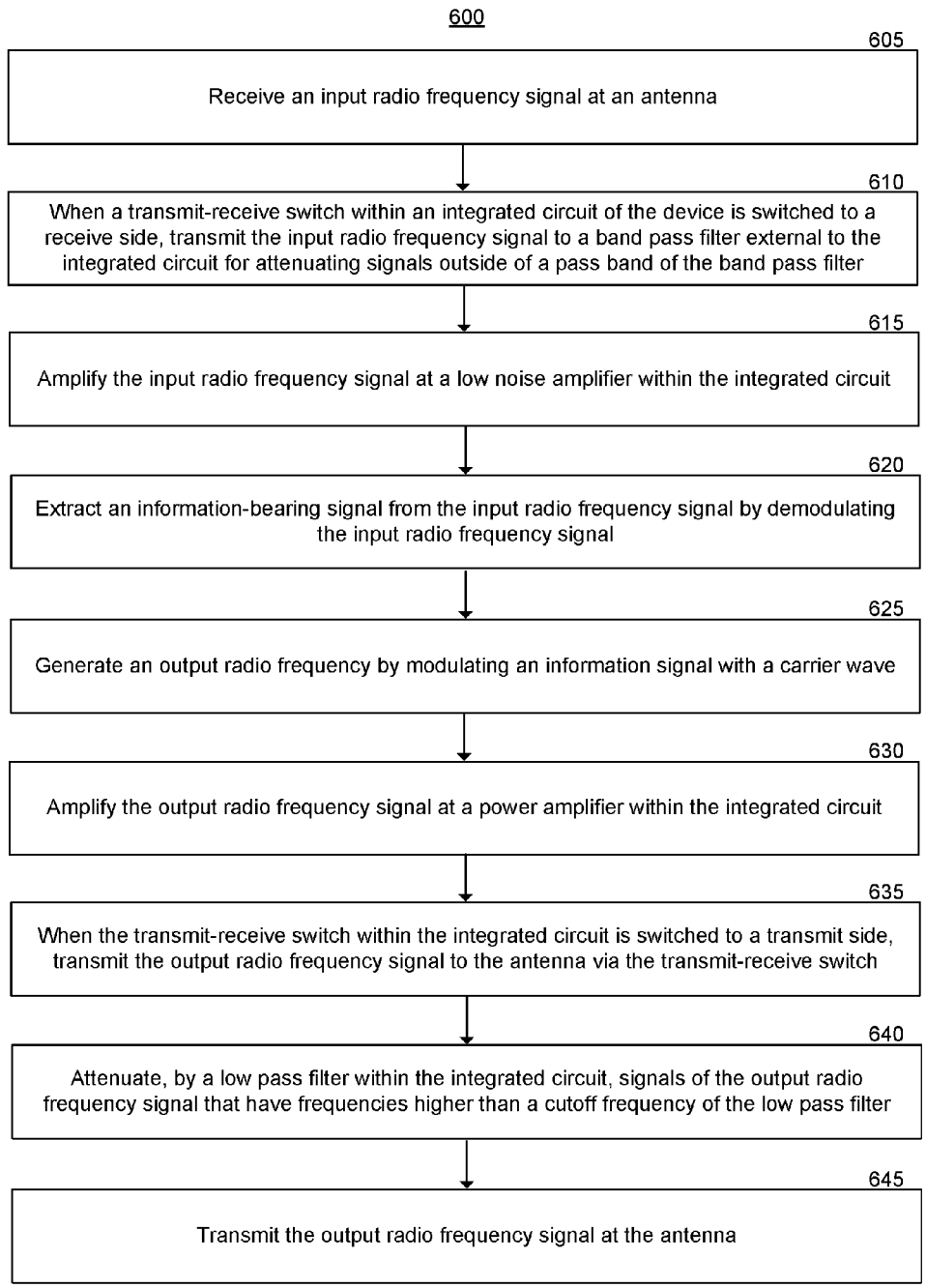
FIG. 6 is a flow diagram showing a process for transmitting, receiving and processing radio frequency signals, according to an embodiment.

FIG. 6 is a flow diagram showing a process for transmitting, receiving and processing radio frequency signals, according to an embodiment. Devices illustrated in other figures can perform the process illustrated in FIG. 6. In step 605, an antenna of a wireless networking device receives an input radio frequency signal from an antenna. In step 610, when a transmit-receive switch within an integrated circuit of the device is switched to a receive side, the device transmits the input radio frequency signal to a band pass filter for attenuating signals outside of a pass band of the band pass filter. The band pas filter is external to the integrated circuit. In step 615, the device amplifies the input radio frequency signal at a low noise amplifier within the integrated circuit. In step 620, the device extracts an information-bearing signal from the input radio frequency signal by demodulating the input radio frequency signal.

In step 625, the device generates an output radio frequency by modulating an information signal with a carrier wave. In step 630, the device amplifies the output radio frequency signal at a power amplifier within the integrated circuit. In step 635, when the transmit-receive switch within the integrated circuit is switched to a transmit side, the device transmits the output radio frequency signal to the antenna via the transmit-receive switch. In step 640, the device attenuates, by a low pass filter within the integrated circuit, signals of the output radio frequency signal that have frequencies higher than a cutoff frequency of the low pass filter. In step 645, the device transmits the output radio frequency signal at the antenna.

Those skilled in the art will appreciate that the logic illustrated in FIG. 6 and described above, may be altered in a variety of ways. For example, the order of the logic may be rearranged, substeps may be performed in parallel, illustrated logic may be omitted, other logic may be included, etc. For example, the device can perform the steps 605-620 for the input radio frequency signal and the steps 625-645 for the output radio frequency signal simultaneously or alternatively, under a time-division multiplexing framework realized by the transmit-receive switch.

Figure 7:
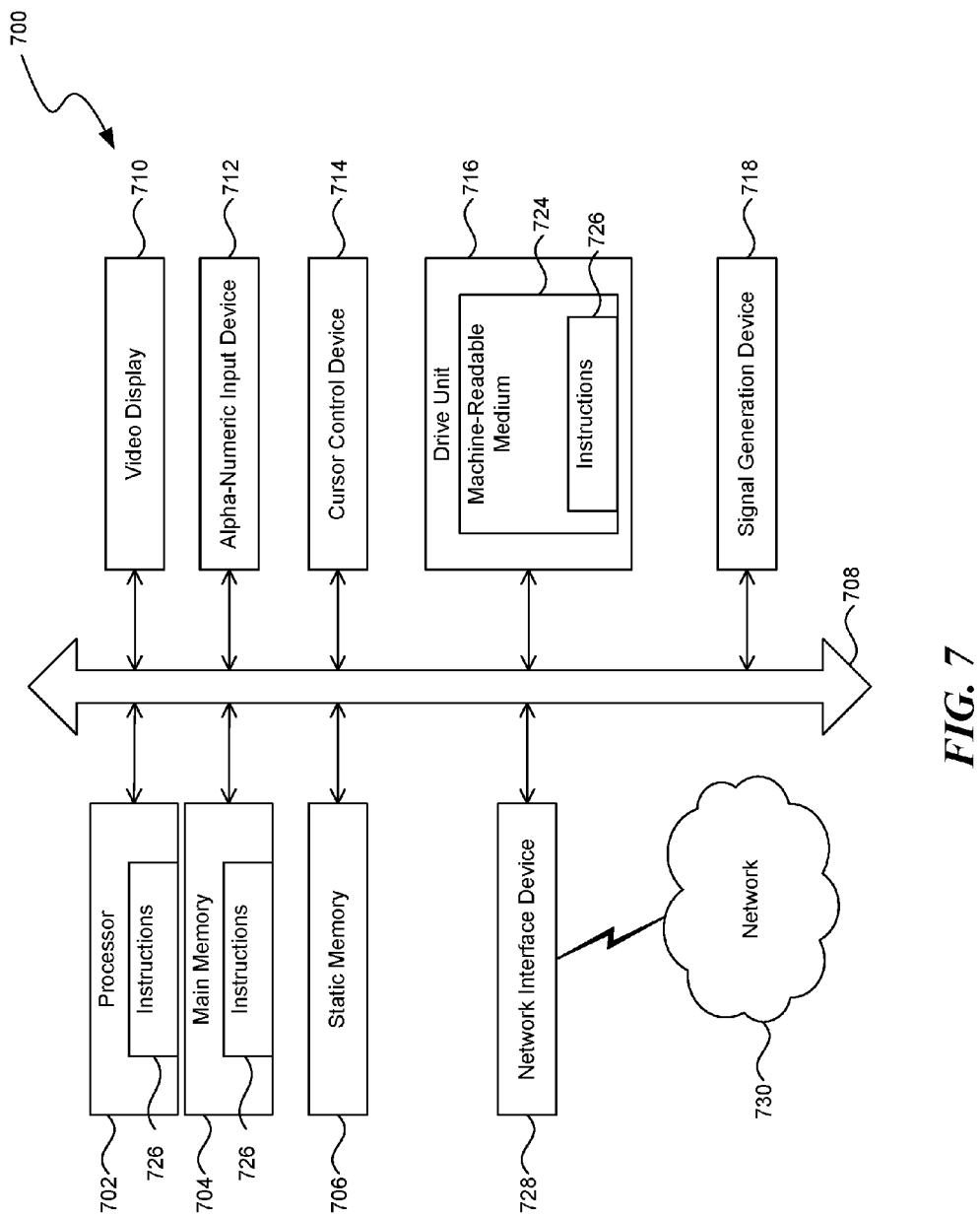
FIG. 7 is a block schematic diagram of a machine, according to an embodiment of the invention.

Embodiments of the invention may be implemented using an electronic processing apparatus. As a specific example, FIG. 7 shows an electronic processing apparatus 700. The apparatus 700 includes a processor 702, such as a microprocessor, personal computer, mobile phone or other mobile personal computing device, workstation, controller, microcontroller, state machine, or other processing machine, coupled to a digital data storage 704. In the present example, the storage 704 includes a fast-access storage 706, as well as nonvolatile storage 708. The fast-access storage 706 may be used, for example, to store the programming instructions executed by the processor 702. The storage 706 and 708 may be implemented by various devices. Many alternatives are possible. For instance, one of the components 706, 708 may be eliminated; furthermore, the storage 704, 706, and/or 708 may be provided on-board the processor 702, or even provided externally to the apparatus 700.

The apparatus 700 also includes an input/output 710, such as a connector, line, bus, cable, buffer, electromagnetic link, network, modem, transducer, IR port, antenna, or other means for the processor 702 to exchange data with other hardware external to the apparatus 700.

Various instances of digital data storage may be used to embody the storage 704 and 708, and for other purposes. Depending on its application, this digital data storage may be used for various functions, such as storing data, or to store machine-readable instructions. These instructions may themselves aid in carrying out various processing functions, or they may serve to install a software program upon a computer, where such a software program is then executable to perform other functions related to this disclosure.

In any case, the storage media may be implemented by nearly any mechanism to digitally store machine-readable signals. One example is optical storage such as CD-ROM, WORM, DVD, digital optical tape, disk storage, or other optical storage. Another example is direct access storage, such as a conventional "hard drive", redundant array of inexpensive disks ("RAID"), or another direct access storage device ("DASD"). Another example is serial-access storage such as magnetic or optical tape. Still other examples of digital data storage include electronic memory such as ROM, EPROM, flash PROM, EEPROM, memory registers, battery backed-up RAM, etc.

An exemplary storage medium is coupled to a processor so the processor can read and write information from and to the storage medium. In the alternative, the storage medium may be integral to the processor. In another example, the processor and the storage medium may reside in an ASIC or other integrated circuit.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

Furthermore, although elements of the invention may be described or claimed in the singular, reference to an element in the singular is not intended to mean "one and only one" unless explicitly so stated, but shall mean "one or more". Additionally, ordinarily skilled artisans will recognize that operational sequences must be set forth in some specific order for the purpose of explanation and claiming, but the present invention contemplates various changes beyond such specific order.

The invention claimed is:

1. A wireless networking device for transmitting and receiving radio frequency signals, the device comprising:
    an antenna configured to transmit an output radio frequency signal and to receive an input radio frequency signal;
    a front end module, the front end module including an integrated circuit to transmit the output radio frequency signal to the antenna and to receive the input radio frequency signal from the antenna under a time-division multiplexing framework, the integrated circuit amplifying the output radio frequency signal and the input radio frequency signal, said front end module configured to adjust characteristics of a band pass filter to process signals from a different frequency band;
    wherein the integrated circuit includes:
        a transmit-receive switch having a transmit port, a receive port and an antenna port, the transmit-receive switch during operation alternates between coupling the antenna port to the transmit port and coupling the antenna port to the receive port;
        a power amplifier configured to amplify the output radio frequency signal, when the antenna port is coupled to the transmit port;
        a low noise amplifier configured to amplify the input radio frequency signal when the antenna port is coupled to the receive port; and
        two external filter leads coupling the band pass filter outside the integrated circuit between the low noise amplifier and the receive port of the transmit-receive switch; and
    a radio signal component configured to modulate a carrier wave to construct the output radio frequency signal, and to demodulate the input radio frequency signal to extract an information-bearing signal.

2. The device of claim 1, wherein the front end module further includes the band pass filter coupled to the integrated circuit, the band pass filter configured to pass signals at frequencies within a specific pass band of the output and input radio frequency signals and attenuates signals at other frequencies outside the specific pass band.

3. The device of claim 1, further comprising:
    an impedance matching circuit coupled between the antenna and the front end module, the impedance matching circuit configured to match an input impedance of the front end module with an impedance of the antenna.

4. The device of claim 1, further comprising:
    a second front end module, wherein the front end module and the second front end module are configured to process radio frequency signals at two different frequency bands respectively; and
    a diplexer coupled between the antenna and the front end module and the second front end module, wherein the antenna transmits and receives the radio frequency signals at the two different frequency bands, and the diplexer is configured to separate the radio frequency signals at the two different frequency bands.

5. The device of claim 1, further comprising:
    a second front end module, wherein the second front end module is configured to process radio frequency signals at a second frequency band; and
    a second antenna coupled to the second front end module, wherein the second antenna is configured to transmit and receive the radio frequency signals at the second frequency band; and
    wherein the front end module is configured to process radio frequency signals at a first frequency band, and the antenna is configured to transmit and receive the radio frequency signals at the first frequency band.

6. The device of claim 1, wherein the wireless networking device is a wireless access point device.

7. The device of claim 1, wherein the wireless networking device is a base station device that conforms to an IEEE 801.11 standard.

8. The device of claim 1, wherein the band pass filter is selected from a plurality of band pass filters each having to process signals from a different frequency band.

9. The device of claim 8, wherein the integrated circuit includes two external filter leads coupling the band pass filter outside the integrated circuit between a low noise amplifier of the integrated circuit and a receive port of a transmit-receive switch of the integrated circuit.

10. The device of claim 9, wherein the integrated circuit includes a low pass filter coupled between a power amplifier and an antenna port of the transmit-receive switch, the low pass filter configured to pass low-frequency signals and attenuate signals with frequencies higher than a cutoff frequency; and the low noise amplifier configured to amplify the input radio frequency signal when the antenna port is coupled to the receive port.

11. A method for transmitting and receiving radio frequency signals, the method comprising:
    receiving an input frequency signal at an antenna;
    transmitting, via an integrated circuit, an output radio frequency signal to the antenna and receiving an input radio frequency signal from the antenna under a time-divisional multiplexing framework, the integrated circuit amplifying the output radio frequency signal and the input radio frequency signal, a front end module adjusting characteristics of a band pass filter to process signals from a different frequency band;
    wherein the integrated circuit further comprises:
        alternating operation of a transmit-receive switch having a transmit port, a receive port, and an antenna port between coupling the antenna port to the transmit port and coupling the antenna port to the receive port;

amplifying the output radio frequency signal with a power amplifier when the antenna port is coupled to the transmit port;

amplify the input radio frequency signal with a low noise amplifier configured when the antenna port is coupled to the receive port; and coupling, via two external filter leads, the band pass filter outside the integrated circuit between the low noise amplifier and the receive port of the transmit-receive switch; and modulating a carrier wave to construct the output radio frequency signal, and to demodulate the input radio frequency signal to extract an information-bearing signal.

12. The method of claim 11, further comprising:
passing signals by the band pass filter, frequencies within a specific pass band of the output and input radio frequency signals; and attenuating signals at other frequencies outside the specific pass band.

13. The method of claim 11, further comprising:
matching, via an impedance matching circuit coupled between the antenna and a front end module, an input impedance of the front end module.

14. The method of claim 11, further comprising:
processing, via a front end module and a second front end module, radio frequency signals at two different frequency bands respectively;
transmitting and receiving the radio frequency signals at the two different frequency bands; and separating, via a duplexer, the radio frequency signals at the two different frequency bands.

15. The method of claim 11, further comprising:
processing, via a second front end module, radio frequency signals at a second frequency band;
transmitting and receiving, via a second antenna coupled to a second front end module, the radio frequency signals at the second frequency band.

16. The method of claim 11, wherein the band pass filter is selected from a plurality of band pass filters each having to process signals from a different frequency band.

17. The method of claim 16, further comprising:
coupling the band pass filter outside the integrated circuit between a low noise amplifier of the integrated circuit and a receive port of a transmit-receive switch of the integrated circuit.

18. The method of claim 17, further comprising:
coupling, using an integrated with a low pass filter, a power amplifier and an antenna port of the transmit-receive switch.

19. The method of claim 18, further comprising:
coupling, using an integrated with the low pass filter, the power amplifier and the antenna port of the transmit-receive switch, wherein the low pass filter passes low-frequency signals and attenuates signals with frequencies higher than a cutoff frequency.

20. The method of claim 19, further comprising:
amplifying the input radio frequency signal when the antenna port is coupled to the receive port.

* * * * *